United States Patent [19]
Jansen

[11] Patent Number: 6,069,467
[45] Date of Patent: May 30, 2000

[54] SENSORLESS ROTOR TRACKING OF INDUCTION MACHINES WITH ASYMMETRICAL ROTOR RESISTANCE

[75] Inventor: Patrick Lee Jansen, Alplaus, N.Y.

[73] Assignee: General Electric Company, Schenectady, N.Y.

[21] Appl. No.: 09/192,347

[22] Filed: Nov. 16, 1998

[51] Int. Cl.$^7$ .................................................. H02P 5/34
[52] U.S. Cl. ....................... 318/802; 318/801; 318/811; 318/813
[58] Field of Search ................................... 318/654, 675, 318/684, 827, 727, 798–815, 780; 281/76.41–76.48

[56] References Cited

U.S. PATENT DOCUMENTS

| | | | |
|---|---|---|---|
| 4,163,928 | 8/1979 | Patterson et al. | 318/808 |
| 4,761,703 | 8/1988 | Kliman et al. | 318/807 |
| 5,294,876 | 3/1994 | Lipo et al. | . |
| 5,304,882 | 4/1994 | Lipo et al. | 310/156 |
| 5,334,923 | 8/1994 | Lorenz et al. | . |
| 5,521,482 | 5/1996 | Lang et al. | 318/800 |
| 5,559,419 | 9/1996 | Jansen et al. | 318/808 |
| 5,565,752 | 10/1996 | Jansen et al. | 318/807 |
| 5,585,709 | 12/1996 | Jansen et al. | 318/807 |

OTHER PUBLICATIONS

J. Cilia, GM Asher, KJ Bradley, M. Sumner, "Sensorless Position Detection for Vector–Controlled Induction Motor Drives Using An Asymmetric Outer–Section Cage", IEEE Transactions On Industry Applications, vol. 33, No. 5, Sep.–Oct., 1997, pp. 1162–1169.

P.L. Jansen, R.D. Lorenz, DW Novotny, "Observer–Based Direct Filed Orientation: Analysis and Comparison of Alternative Methods", IEEE Transactions On Industry Applications, vol. 30, No. 4, Jul./Aug., 1994, pp. 945–953.

Y. Xue, X. Xu, T.G. Habetler, D.M. Divan, "A Stator Flux–Oriented Voltage Source Variable–Speed Drive Based On dc Link Measurement", IEEE Transactions On Industry Applications, vol. 27, No. 5, Sep./Oct. 1991, pp. 962–969.

M.W. Denger, R.D. Lorenz, "Using Multiple Saliencies for the Estimation of Flux, Position, and Velocity in AC Machines", IEEE Industry Applications Society Annual Meeting, New Orleans, LA, Oct. 5–9, 1997.

*Primary Examiner*—David S. Martin
*Attorney, Agent, or Firm*—Ann M. Agosti; Jill M. Breedlove

[57] ABSTRACT

A drive system for providing ac drive power to an induction machine with asymmetrical rotor resistance and for sensorless rotor tracking of the induction machine includes: a signal injector for determining a stator command signal in a reference frame which is aligned with either an estimated rotor reference frame; a signal determiner for determining a feedback stator signal of the induction machine in a stator reference frame; and a rotor position and velocity tracker for using the feedback stator signal to estimate a rotor velocity and position by transforming the feedback stator signal into an orthogonal axis feedback stator signal in the estimated rotor reference frame, isolating a component of the orthogonal axis feedback stator signal which is in-phase with the injected stator command signals, filtering the isolated component to isolate an error term, and generating a position estimate by driving the isolated error term towards zero. In several related embodiments a flux axis stator command signal is injected into the drive system and flux axis and torque axis stator feedback signals are then used for rotor position and velocity tracking.

27 Claims, 9 Drawing Sheets

SENSORLESS ROTOR TRACKING OF INDUCTION MACHINES WITH ASYMMETRICAL ROTOR RESISTANCE

BACKGROUND OF THE INVENTION

The present invention relates generally to tracking of induction machines without rotor position or speed sensors.

The elimination of rotor shaft transducers is highly desirable to reduce cost, reduce total motor package size, and to improve system reliability. Rotor shaft transducers tend to be a major source of failure and expense in ac motor drives in both industrial and traction applications.

Prior approaches to tracking and control of induction machines without rotor position or speed sensors are described, for example, in Jansen et al., U.S. Pat. Nos. 5,565,752 and 5,585,709, and in Cilia et al., "Sensorless Position Detection for Vector-Controlled Induction Motor Drives Using an Asymmetric Outer-Section Cage," IEEE Transactions on Industry Applications, Vol. 33, No. 5, September/October 1997 pp. 1162–69. These embodiments have difficulty in robustly tracking rotor resistance variations in motors with closed-rotor slots because saturation of the rotor slot bridges creates a variable spatial modulation or asymmetry in the rotor leakage inductance that corrupts the tracking methods. Most induction machines are fabricated with aluminum die-cast rotor cages. In these motors, closed-rotor-slot designs are used to contain the molten aluminum during casting and are thus the predominate slot type to minimize manufacturing costs.

SUMMARY OF THE INVENTION

It is therefore seen to be desirable to provide a means of enabling "sensorless" control of induction motor drives that: (1) is robust at all operating frequencies and speeds, particularly low and zero frequency; and (2) provides accurate tracking and control of rotor velocity and position regardless of whether open or closed rotor slots are used.

Briefly, according to one embodiment of the present invention, a drive system provides ac drive power to an induction machine with asymmetrical rotor resistance using sensorless rotor tracking of the induction machine. The drive system includes a signal injector for determining a nonrotating ac stator command signal in one or more axes in a reference frame aligned with an estimated rotor position (an estimated rotor reference frame) and for transforming the determined stator command signal to a reference frame suitable for injection into the drive system. The drive system is adapted to use the transformed stator command signal to provide injected power to the induction machine. A signal determiner determines a feedback stator signal of the induction machine in a stator reference frame which is used by a rotor position and velocity tracker (RPVT) to estimate a rotor position. The RPVT includes an RPVT transformer for transforming the feedback stator signal into a feedback stator signal in the estimated rotor reference frame, an RPVT in-phase component isolator for extracting a component of the feedback stator signal in the estimated rotor reference frame which is orthogonal to the one or more axes in the estimated rotor reference frame in which the ac stator command signal is determined, and which is in-phase with the stator command signal, to isolate an error term, and a controller for generating a rotor position estimate by driving the isolated error term towards zero.

In several related embodiments a flux axis stator command signal is injected into the drive system. In these embodiments, flux axis and torque axis stator feedback signals are then used for rotor position and velocity tracking.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

FIG. 9 is a block diagram of a real-time resistance error correction embodiment for separating net average resistance and delta rotor resistance in the embodiment of FIG. 8.

DETAILED DESCRIPTION OF A PREFERRED EMBODIMENT OF THE INVENTION

Figure 1:
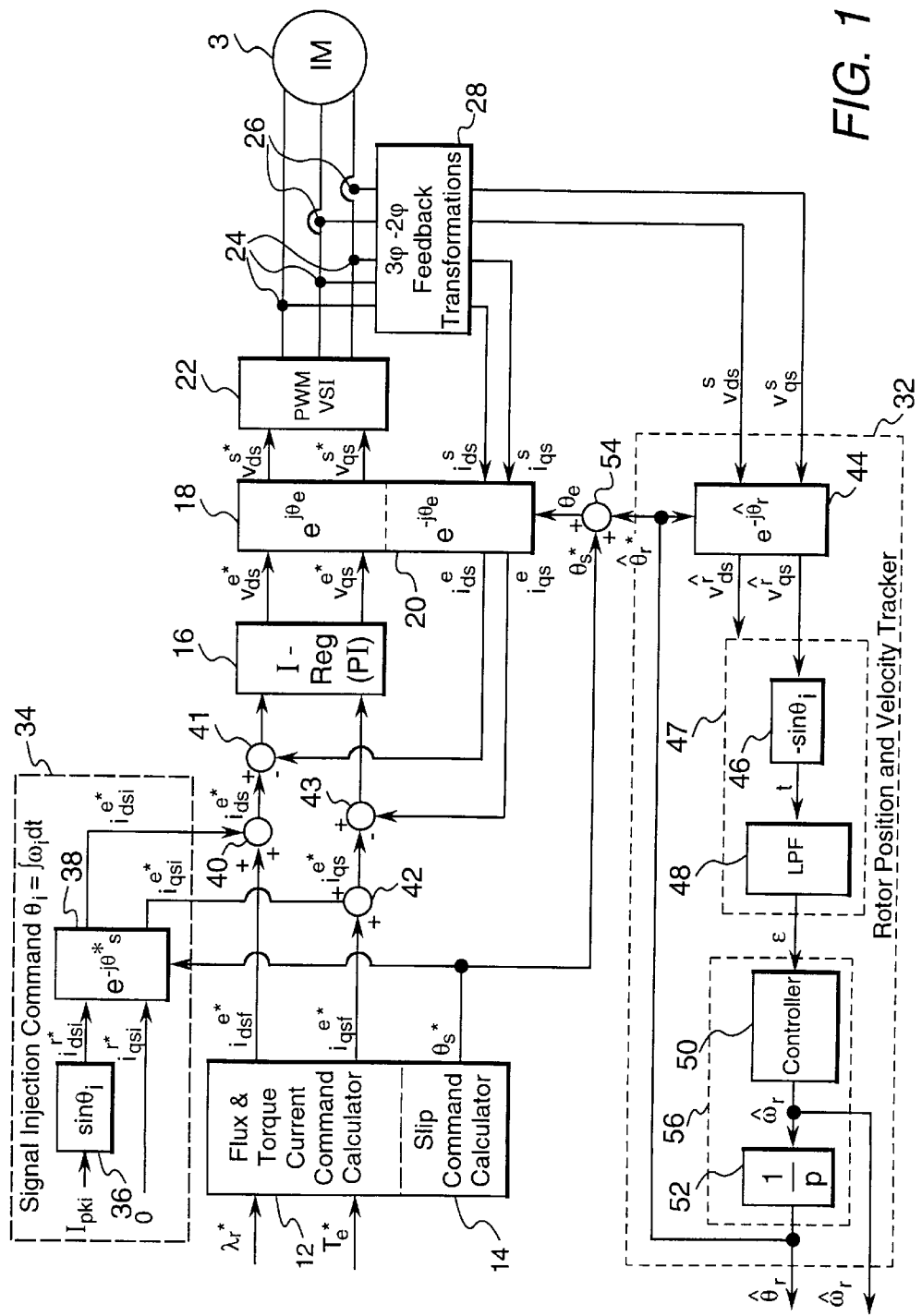
FIG. 1 is a block diagram of one embodiment of the present invention in which a sensorless indirect-field-orientation control scheme incorporates ac current signal injection to track a high frequency asymmetry in rotor resistance.

As stated in the summary, according to one embodiment of the present invention, described with respect to FIGS. 1–6, a drive system provides ac drive power to an induction machine with asymmetrical rotor resistance using sensorless rotor tracking of the induction machine. The drive system includes a signal injector for determining a nonrotating ac stator command signal in one or more axes in a reference frame aligned with an estimated rotor position (an estimated rotor reference frame) and for transforming the determined stator command signal to a reference frame suitable for injection into the drive system. The drive system is adapted to use the transformed stator command signal to provide injected power to the induction machine. A signal determiner determines a feedback stator signal of the induction machine in a stator reference frame which is used by a rotor position and velocity tracker (RPVT) to estimate a rotor position. The RPVT includes an RPVT transformer for transforming the feedback stator signal into a feedback stator signal in the estimated rotor reference frame, an RPVT in-phase component isolator for extracting a component of the feedback stator signal in the estimated rotor reference frame which is orthogonal to the one or more axes in the estimated rotor reference frame in which the ac stator command signal is determined, and which is in-phase with the stator command signal, to isolate an error term, and a controller for generating a rotor position estimate by driving the isolated error term towards zero.

In several related embodiments, described with respect to FIGS. 7–10, only a flux axis stator command signal is injected. In these embodiments, flux axis and torque axis stator feedback signals are then used for rotor position and velocity tracking with the rotor position and velocity tracker additionally attenuating non-rotor position dependent components from the feedback flux axis signal.

The inventions are applicable whether a machine is used as a motor or a generator. As shown below, the stator command signal injection may be in the form of current or a voltage. If the stator command signals are in the form of current, then the feedback stator signal will be in the form of voltage, and if the stator command signals are in the form of voltage, the stator feedback signal will be in the form of current. Either injection embodiment may be used in indirect-field-orientation and direct-field-orientation control embodiments. Furthermore, the determination of the ac stator command signal can be performed with a sine function, a cosine function, or a function in between a sine and cosine function. The invention may be included in digital or analog implementations or in an embodiment combining digital and analog devices.

The term "sensorless" is used to denote the absence of traditional rotor position or velocity shaft transducers such as encoders, resolvers, or tachometers. The determined motor terminal voltages and currents within the ac drive system inverter are the feedback source used by the invention to enable rotor velocity and position tracking to provide sensorless control. The determined terminal voltages and currents can be obtained via either measurement with sensors, or determined through software, as described in Y. Xue et al., "A Stator Flux-Oriented Voltage Source Variable-Speed Drive Based on dc Link Measurement", IEEE Transactions on Industry Applications, Vol. 27, No. 5, September/October. 1991, pp. 962–969. Unlike conventional methods of tracking rotor resistance variations, the embodiments of the present invention can provide robust tracking with rotors of open, semi-closed, or fully closed rotor slot bridge designs. Several embodiments for constructing rotors to provide resistance variations are described, for example, in Jansen et al., U.S. patent application No. 09/127,948, filed Aug. 3, 1998; in aforementioned Jansen et al., U.S. Pat. Nos. 5,565,752 and 5,585,709; and in aforementioned Cilia et al., "Sensorless Position Detection for Vector-Controlled Induction Motor Drives Using an Asymmetric Outer-Section Cage." Optionally, the rotor velocity and/or position estimate can be used in a closed-loop fashion to control rotor velocity and/or position via numerous well-known means. One example of a closed loop embodiment is described in *Vector Control and Dynamics of AC Drives*, by D. W. Novotny and T. A. Lipo, Oxford Science Publications, 1996.

The embodiments of the present invention are expected to be particularly useful for polyphase induction machines in smaller frame sizes generally less than 100 horsepower (4 pole). Larger machines have smaller per unit rotor resistances, thereby decreasing the signal to noise ratio of the trackable error signal.

In the apparatus of FIG. 1, one embodiment of a drive system 10 of the present invention is shown in a block diagram in which a sensorless indirect-field-orientation (IFO) control scheme incorporates ac current signal injection to track a high frequency asymmetry in rotor resistance.

Figure 2:
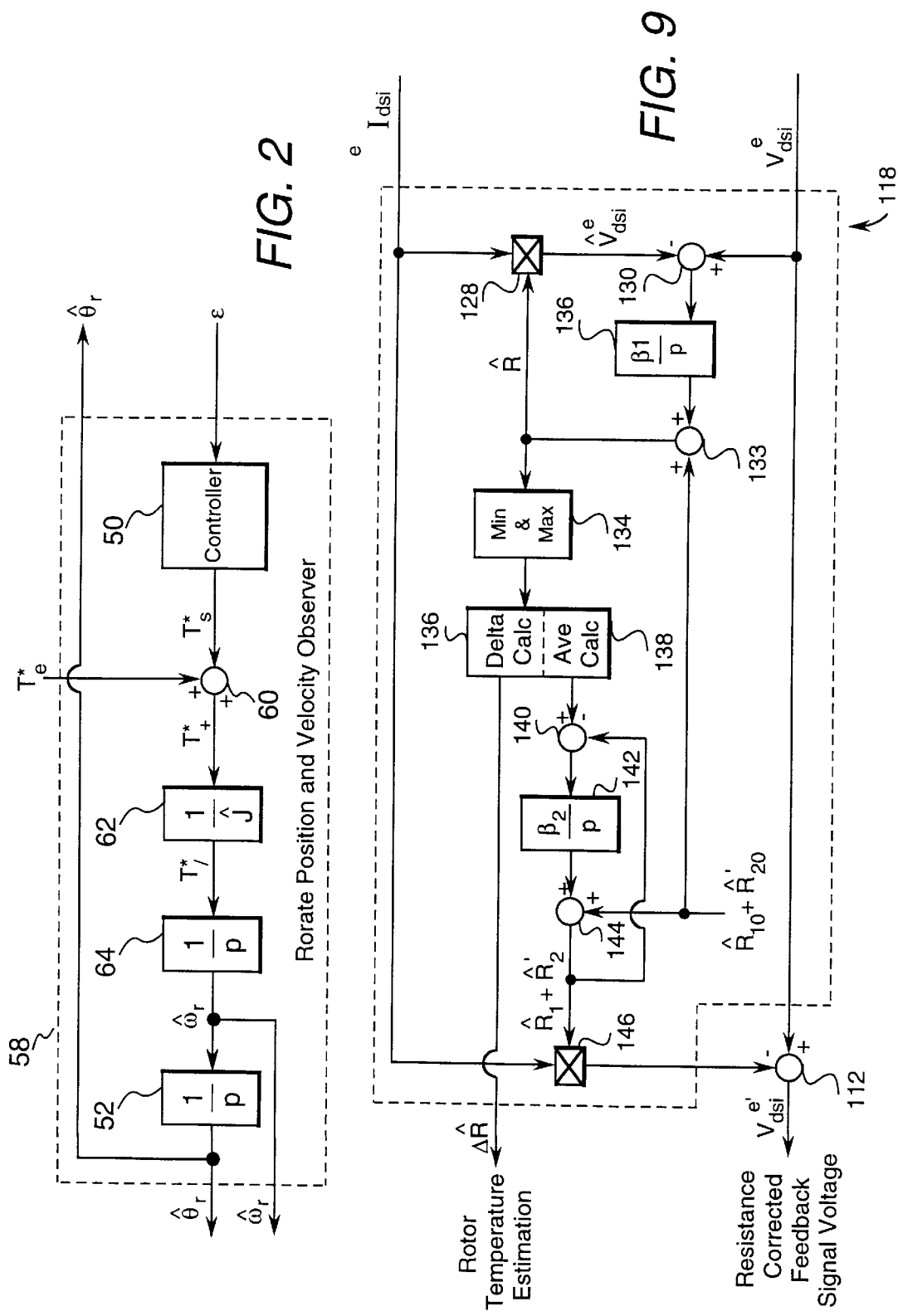
FIG. 2 is a block diagram of a rotor position and velocity observer based on a mechanical system model with torque command feedforward.

Conventional IFO control schemes typically include a flux and torque current command calculator 12, a slip command calculator 14, a synchronous frame current regulator 16, reference frame transformers 18 and 20 for providing transforms between synchronous and stationary reference frames, a PWM voltage-source-inverter (VSI) 22, and feedback of motor line voltages and currents. Feedback stator line voltages and current signals can be obtained from current sensors 24, voltage sensors 26, and a three-phase to two-phase transformer 28 as shown in FIG. 1 or from control hardware or software 29 as shown in FIG. 2 which estimates the values from other parameters. The term "feedback" stator signal as used herein is meant to include either a signal derived from a sensor or a signal determined from control software or hardware.

Conventional IFO control embodiments generally include a rotor speed or position feedback transducer such as an encoder (not shown). Although not shown, voltage feedforward is usually added in parallel to PI current regulator 16 to improve current regulation response, and slip command calculator 14 usually uses voltage and current feedback to correct for parameter errors during operation.

In place of the feedback transducer of such conventional IFO control embodiments, the sensorless control scheme of the embodiment of FIG. 1 uses an induction machine 30 with asymmetrical rotor resistance, and a rotor position/velocity tracker 32 in conjunction with a signal injector 34. In the embodiment of FIG. 1, the signal injection is introduced by an ac signal current command $I_{pki}$ at frequency $\omega_i$ in the estimated rotor position reference frame. In this reference frame, the signal command is single phase ac; e.g., a q-axis command is zero, while a d-axis command (from a calculator 36) is $I_{pki} \sin \theta_i t$. The use of a sin $\theta_i$ block for calculator 36 is for example only. A cosine operation or an operation between a sine and cosine could alternatively be used. Additionally, the determination of a stator command signal on the d-axis is for purposes of example only. The ac signal current command can be determined on one or more axes (the d-axis, the q-axis, or a combination of these axes), if desired.

The signal current commands $i_{dsi}^{r*}, i_{qsi}^{r*}$ are rotated to the synchronous rotor flux frame by transformer 38 and the rotated commands $i_{dsi}^{e*}, i_{qsi}^{e*}$ are added to the fundamental current commands $i_{dsf}^{e*}, i_{qsf}^{e*}$ from flux and torque current command calculator 12 at adders 40 and 42 to create the net current commands $i_{ds}^{e*}, i_{qs}^{e*}$. Injection in the synchronous rotor flux frame is for purposes of example only. The signal current commands can be transformed and injected into any reference frame suitable for injection into the drive system. Subtractors 41 and 43 subtract feedback stator currents which have been transformed into the synchronous rotor flux frame $i_{ds}^{e}, i_{qs}^{e}$ from the net current commands and supply the differences to current regulator 16.

The signal frequency, $\omega_i$ is chosen to be above the fundamental excitation frequency range at which the motor control scheme is to operate with signal injection, and below the PWM inverter switching frequency. The typical signal frequency will also be dependent upon whether the signal injection is of current or voltage command type. For current command injection, the signal frequency will generally be within the bandwidth of the current regulator(s) and may be between about 50 and 400 Hz. For voltage command injection (as per FIG. 5), the signal frequency may typically be between 100 and about 2000 Hz. In general, to minimize the effect of torque ripple created by the signal injection, the signal frequency is preferably as high as permitted by the PWM inverter and current regulators, and, if feedback current and voltage sensors 24 and 26 are used, the signal amplitude is preferably as low as permitted by the feedback sensors.

In the embodiment of FIG. 1, voltage feedback signals $v_{ds}^s, v_{qs}^s$ in the stator reference frame serve as input signals to the rotor position and velocity tracker 32. The signals are rotated from the stationary frame to the estimated rotor reference frame by transformer 44 using an estimate of the rotor position angle $\hat{\theta}_r$. The voltage feedback signals in the estimated rotor reference frame then have a component extracted in the estimated rotor reference frame which is orthogonal to the one or more axes in the estimated rotor reference frame in which the ac stator command signal was determined, and which is in-phase with the stator command signal. In the embodiment of FIG. 1, the extraction is accomplished by multiplying the q-axis (which is orthogonal to the determined signal current command d-axis) feedback signal in the estimated rotor reference frame by an ac quantity 180 degrees out of phase with the signal command (by a block 46, shown as a $-\sin\theta_i t$ block, for example). After low pass filtering by low pass filter (LPF) 48 to suppress fundamental excitation and twice signal injection frequencies, an error term $\epsilon$ is isolated. The combination of block 46 and LPF 48 will hereinafter be referred to as in-phase component isolator 47. A controller 50 drives the error to zero by generating a velocity estimate $\hat{\omega}_r$, which when integrated by integrator 52 produces a rotor position estimate $\hat{\theta}_r$. Controller 50 may comprise, for example, a PI (proportional integral) controller, a PID (proportional, integral, and derivative) controller, or a sliding mode controller.

The rotor position estimate is fed back to the reference frame transformer 44 and to an adder 54 which sums the position estimate with slip command angle $\theta^*_s$ to provide a field orientation angle $\theta_e$ defining the synchronous rotor flux reference frame for use by transformers 18 and 20.

FIG. 2 is a block diagram of a rotor position and velocity observer 58 based on a mechanical system model with torque feedforward signal $T^*_e$ (which may be either a commanded or estimated signal). In this embodiment, combination 56 of controller 50 and integrator 52 is replaced by rotor position and velocity observer 58. Including such an observer can improve rotor velocity and position tracking capability during transient conditions.

In the observer of FIG. 2, controller 50 generates a torque signal $T_s^*$ representing the difference between the torque feedforward signal and the torque required to give the correct rotor position tracking based upon the assumed motor mechanical model. More elaborate mechanical models can be incorporated within the observer, if more information is known about the mechanical load. Adder 60 then sums the output signal of controller 50 with torque feedforward signal $T^*_e$. Divider 62 divides the sum $(T^*_+)$ of adder 60 by the moment of inertia of the rotor and load to estimate the rotor acceleration (shown by divided torque signal $T^*_i$)

which is then integrated by integrator 64 to provide the estimated rotor velocity $\hat{\omega}_r$.

The derivation of position error with current signal injection in the embodiment of FIG. 1 is discussed below with reference to Equations 1–17.

The rotor resistance $\overline{R}_2^r$ of an induction motor with asymmetrical rotor resistance can be represented by the following matrix in the rotor reference frame:

$$\overline{R}_2^r = \begin{bmatrix} R_{2q} & 0 \\ 0 & R_{2d} \end{bmatrix}, \tag{1}$$

wherein $R_{2q}, R_{2d}$ represent rotor resistances in the rotor reference frame and are designed to be not equal.

The rotor resistance matrix in a reference frame corresponding to an estimate of the rotor angular position can be shown to be $$\overline{R}_2^{\hat{r}} = \begin{bmatrix} R_2 + \Delta R_2\cos(2\theta_{err}) & -\Delta R_2\sin(2\theta_{err}) \\ -\Delta R_2\sin(2\theta_{err}) & R_2 - \Delta R_2\cos(2\theta_{err}) \end{bmatrix}, \tag{2}$$

where $$R_2 = \frac{R_{2q} + R_{2d}}{2}, \tag{3}$$

$$\Delta R_2 = \frac{R_{2q} - R_{2d}}{2}, \text{ and} \tag{4}$$

$$\theta_{err} = \theta_r - \hat{\theta}_r, \tag{5}$$

and wherein $\theta_r$ and $\hat{\theta}_r$ are the actual and estimated angular positions of the rotor, respectively.

If the stator transient inductance is symmetrical and the injected signal frequency is sufficiently high such that back-emf influence is negligible, the injected signal voltage $v_{qsi}^{\hat{r}}$ along the estimated rotor q-axis is approximately $$v_{qsi}^{\hat{r}} \cong R_1 i_{qsi}^{\hat{r}} + L_\sigma p i_{qsi}^{\hat{r}} + \frac{L_m^2}{L_r^2}[R_2 + \Delta R_2\cos(2\theta_{err})]i_{qsi}^{\hat{r}} - \frac{L_m^2}{L_r^2}\Delta R_2\sin(2\theta_{err})i_{dsi}^{\hat{r}} \tag{6}$$

where p is the time derivative operation; i.e., p=d/dt, $L_m$ is the magnetizing inductance, $L_r$ is the rotor self-inductance (magnetizing+rotor leakage), and $R_1$ is the stator resistance.

With signal current injection as per FIG. 1, the stator currents are $$i_{qsi}^{\hat{r}} = 0 \tag{7}$$

$$i_{dsi}^{\hat{r}} = I_{pki}\sin\theta_i \tag{8}$$

where the instantaneous signal injection angle is $$\theta_i = \int \omega_i dt. \tag{9}$$

The q-axis signal voltage is then $$v_{qsi}^{\hat{r}} \cong -\frac{L_m^2}{L_r^2}\Delta R_2\sin(2\theta_{err})i_{dsi}^{\hat{r}} \tag{10}$$

-continued $$\cong -\frac{L_m^2}{L_r^2}\Delta R_2 \sin(2\theta_{err})I_{pki}\sin\theta_i.$$

Multiplication of the signal voltage by $-\sin\theta_i$ followed by low pass filtering leaves:

$$\varepsilon = LPF\left(-v_{qsi}^{\hat{r}}\sin\theta_i\right) \cong \frac{1}{2}\frac{L_m^2}{L_r^2}\Delta R_2 \sin(2\theta_{err})I_{pki} \quad (11)$$

$$\cong \frac{1}{2}\frac{L_m^2}{L_r^2}\Delta R_2 I_{pki}\sin[2(\theta_r - \hat{\theta}_r)].$$

For small differences between actual and estimated rotor position:

$$\varepsilon = LPF\left(-v_{qsi}^{\hat{r}}\sin\theta_i\right) \cong \frac{L_m^2}{L_r^2}\Delta R_2 I_{pki}(\theta_r - \hat{\theta}_r). \quad (12)$$

Equation (12) thus is an error term that can be used to drive an estimate of the rotor position toward the actual value of the rotor position. The error term vanishes for conventional induction motors with symmetric rotors.

If the injected signal frequency does not overlap with the fundamental and inverter switching harmonics, then low pass filter 48 is capable of suppressing fundamental and inverter switching harmonic components. To improve suppression of the fundamental, an estimate of the fundamental voltage calculated from fundamental component command currents and estimated motor parameters can be subtracted from feedback voltage $v_{qs}^{\hat{r}}$ prior to multiplication by $\sin\theta_i$.

In many induction motors, the stator transient inductance will vary with loading and flux level such that symmetry can not be assumed. Like the rotor resistance, the stator transient inductance $\overline{L}_\sigma^{\hat{r}}$ can be described by a matrix of the form:

$$\overline{L}_\sigma^{\hat{r}} = \begin{bmatrix} L_\sigma + \Delta L_\sigma \cos(2\theta_\sigma) & -\Delta L_\sigma \sin(2\theta_\sigma) \\ -\Delta L_\sigma \sin(2\theta_\sigma) & L_\sigma - \Delta L_\sigma \cos(2\theta_\sigma) \end{bmatrix} \quad (13)$$

where $\theta_\sigma$ is the relative angle between the estimated rotor angular position and the angle of the saliency associated with the stator transient inductance $L_\sigma$. This angle is assumed to be not known. With this inductance model, the injected signal voltage along the estimated rotor q-axis becomes $$v_{qsi}^{\hat{r}} \cong R_1 i_{qsi}^{\hat{r}} + [L_\sigma + \Delta L_\sigma \cos(2\theta_\sigma)]p i_{qsi}^{\hat{r}} - \Delta L_\sigma \sin(2\theta_\sigma)p i_{dsi}^{\hat{r}} + \quad (14)$$

$$\frac{L_m^2}{L_r^2}[R_2 + \Delta R_2 \cos(2\theta_{err})]i_{qsi}^{\hat{r}} - \frac{L_m^2}{L_r^2}\Delta R_2 \sin(2\theta_{err})i_{dsi}^{\hat{r}}.$$

From Equations (7) and (8), the voltage becomes $$v_{qsi}^{\hat{r}} \cong -\Delta L_\sigma \sin(2\theta_\sigma)p i_{dsi}^{\hat{r}} - \frac{L_m^2}{L_r^2}\Delta R_2 \sin(2\theta_{err})i_{dsi}^{\hat{r}}. \quad (15)$$

However, the derivative of the d-axis current from Equations (8) and (9) is $$pi_{dsi}^{\hat{r}} = \omega_i I_{pki} \cos\theta_i. \quad (16)$$

Thus the signal voltage is $$v_{qsi}^{\hat{r}} \cong -\Delta L_\sigma \sin(2\theta_\sigma)\omega_i I_{pki}\cos\theta_i - \frac{L_m^2}{L_r^2}\Delta R_2 \sin(2\theta_{err})I_{pki}\sin\theta_i. \quad (17)$$

Although, asymmetries in the stator transient inductance will introduce an additional component in the stator signal voltage, the component is seen to be 90 degrees out of phase from the injected current. Thus the process of multiplication by $-\sin\theta_i$ followed by low pass filtering will isolate the desired error signal of Equation (11). The scheme is thus capable of tracking variations in the rotor resistance and immune to variations in the rotor and stator leakage inductances that comprise the stator transient inductance. Thus rotors having closed and/or open slots can be used (e.g., rotors are not limited to open slot embodiments).

This invention is particularly advantageous as compared with conventional sensorless rotor tracking techniques because of the combination of single-phase ac current (or voltage) signal injection aligned with the rotor reference frame, and the demodulation of resulting voltage (or current) signal component that is in phase with the injected current (or voltage) in the orthogonal axis of the estimated rotor reference frame. Conventional techniques of rotor resistance tracking such as described in aforementioned Cilia et al., "Sensorless Position Detection for Vector-Controlled Induction Motor Drives Using an Asymmetric Outer-Section Cage," IEEE Transactions on Industry Applications, Vol. 33, No. 5, September/October 1997 pp. 1162–69, relied on polyphase rotating signal injection and polyphase signal heterodyning. As a result, the tracking schemes were not capable of decoupling the effects of stator transient inductance variations caused by saturation or rotor slotting from the desired rotor resistance variations and thus could not robustly track the variation in rotor resistance. With the present invention, by injecting in one or more axes, and demodulating the resulting in-phase feedback signal component orthogonal to the one or more axes, the stator transient inductance variations are substantially decoupled from the resistance variations. The resulting tracking scheme of the present invention can thus robustly track rotor resistance variations with disturbance from stator transient inductance variations greatly attenuated, if not completely eliminated.

As with the prior techniques of rotor impedance (resistance and/or leakage inductance) tracking, the accuracy and robustness of the tracking is sensitive to the quality of the signal injection and the feedback isolation. Quality signal injection via an inverter generally includes the use of well known methods for correction of deadtime and snubber effects.

Figure 3:
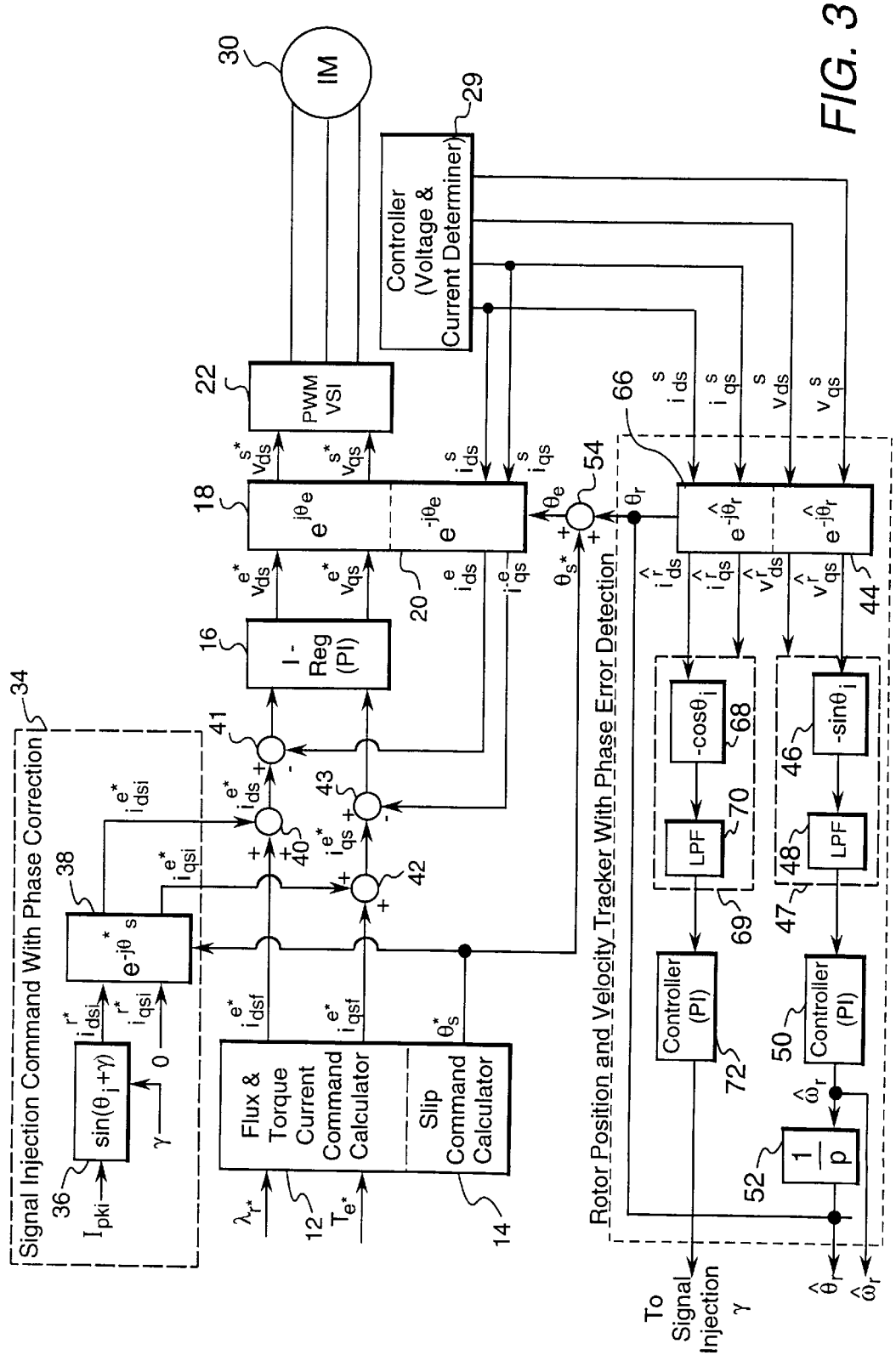
FIG. 3 is a block diagram similar to FIG. 1 with the addition of a signal injection phase correction embodiment.

FIG. 3 is a block diagram similar to FIG. 1 with the addition of a signal injection phase correction embodiment. The above derivation described with respect to Equations (1–17) assumes ideal current regulators. In practice, the actual stator currents will have phase and magnitude errors from the command values. For example, phase lags generally occur in current regulators. The above tracking scheme is not sensitive to magnitude errors, although it is sensitive to phase errors.

In the embodiment of FIG. 3, the phase of the command signal is adjusted to remove phase error measured from current feedback signals. In this embodiment, feedback stator currents $i_{ds}^s, i_{qs}^s$ in the stator reference frame are transformed by transformer 66 into feedback stator currents $i_{ds}^{\hat{r}}, i_{qs}^{\hat{r}}$ in the estimated rotor reference frame.

A component isolator 69 (which may comprise a combination of the cosine block 68 and low pass filter (LPF) block 70, for example) isolates the component of the measured signal current in the estimated rotor reference frame d-axis that is 90 degrees out of phase with the ideal injected d-axis signal current of signal injector 34. If the current regulators were ideal, the measured signal current would be in phase with the injected d-axis signal current, and the output of block 70 would be zero. With non-ideal current regulators, the integral controller 72 adjusts the phase of the commanded signal current through phase adjuster γ in block 36 such the output of block 70 remains zero. The demodulator/tracker is then assured of isolating the actual in-phase signal component via block 46. Alternatively, if desired, the phase adjuster γ can be used to phase adjust the operation of block 46 (to $-\sin(\theta_i+\gamma)$) in a similar manner as shown in block 36.

Figure 4:
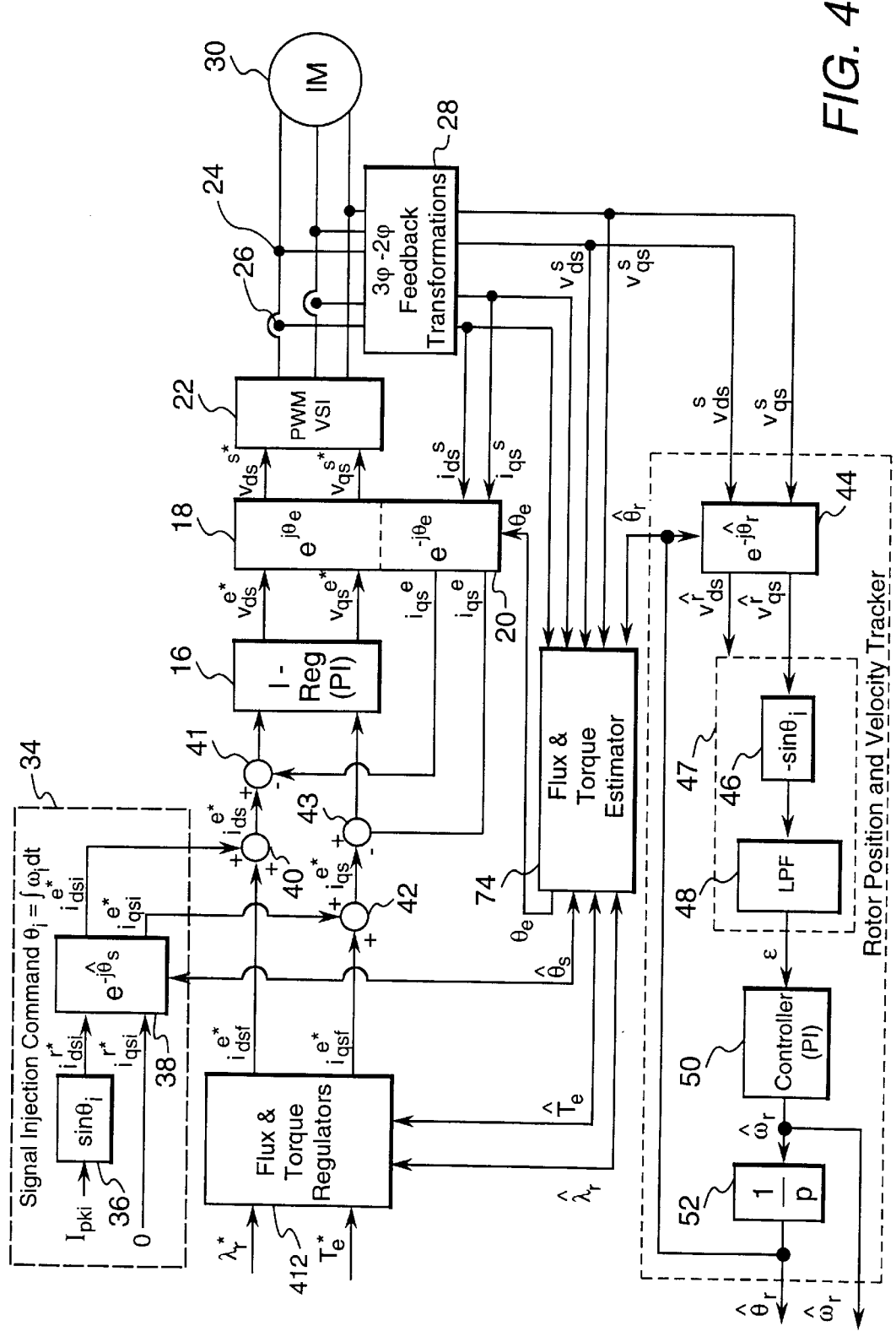
FIG. 4 is a block diagram of another embodiment of the present invention in which a sensorless direct-field-onientation control scheme incorporates ac current signal injection to track a high frequency asymmetry in a rotor.

FIG. 4 is a block diagram of another embodiment of the present invention in which a sensorless direct-field-orientation (DFO) control scheme incorporates ac current signal injection to track a high frequency asymmetry in a rotor.

DFO control schemes differ from IFO control schemes in that a flux and torque estimator 74 uses feedback to estimate rotor (or stator) flux $\hat{\lambda}_r$ and torque $\hat{T}_e$ and to obtain the field orientation angle $\theta_e$ and an estimated slip angle $\hat{\theta}_s$. Because the flux and torque estimator is used to estimate the slip angle, the slip command calculator 14 of FIG. 1 is not needed in the embodiment of FIG. 4.

Flux and torque estimators are well known and can be in the form of open or close-loop observers. One example of a reference where in a flux and torque estimator is described is Jansen et al., "Observer-Based Direct Field Orientation: Analysis and Comparison of Alternative Methods," *IEEE Transaction of Industry Applications*, Vol. 30, No. 4, July/August 1994, pp. 945–953. Preferably, for sustained operating capability at low fundamental excitation frequencies, the flux estimator receives rotor velocity or position input from rotor position and velocity tracker 32. One advantage of this scheme is that the flux and torque estimator enable the signal injection and tracker to be turned off for high speed operation. This can be important in systems with low PWM switching frequencies. Signal injection frequencies can then be used that are even lower than the top fundamental excitation frequencies.

Figure 5:
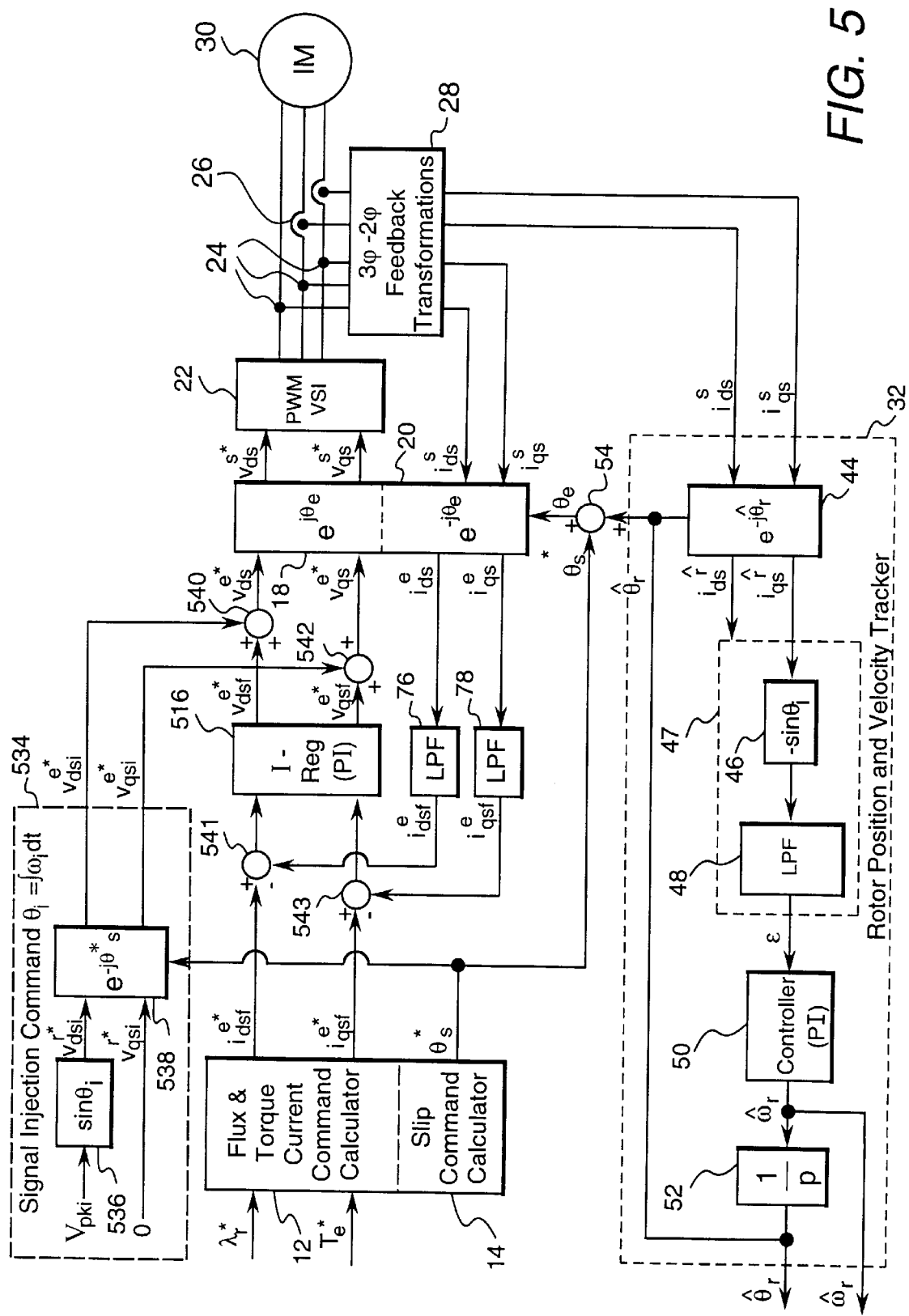
FIG. 5 is a block diagram of another embodiment of the present invention in which a sensorless indirect-field-orientation control scheme incorporates ac voltage signal injection to track a high frequency asymmetry in rotor resistance.

FIG. 5 is a block diagram of another embodiment of the present invention in which a sensorless indirect-field-orientation (IFO) control scheme incorporates ac voltage signal $V_{pki}$ injection to track a high frequency asymmetry in rotor resistance.

When the injection signal commands are voltages rather than currents, feedback currents $i_{ds}^s, i_{qs}^s$ rather than voltages are used as input signals to the rotor velocity/position tracker 32. Current regulator 516 now acts on the fundamental component of stator current. Thus the signal components in the feedback currents should be suppressed prior to input to the current regulators such as via low pass filtering with LPFs 76 and 78 as shown in FIG. 5. Signal voltage injection may be preferable over current injection when the signal frequency is well above the bandwidth achievable by the current regulator 516, for example.

The derivation for voltage signal injection is similar to that for current signal injection with a number of additional considerations.

If the stator transient inductances $L_\sigma$ are symmetrical and constant, the voltage equations for the command signal components of stator voltage in the rotor reference frame can be written as $$v_{qsi}^{\hat{r}} = R_{qq} i_{qsi}^{\hat{r}} + L_\sigma p i_{qsi}^{\hat{r}} + R_{qd} i_{dsi}^{\hat{r}}, \text{ and} \quad (18)$$

$$v_{dsi}^{\hat{r}} = R_{dd} i_{dsi}^{\hat{r}} + L_\sigma p i_{dsi}^{\hat{r}} + R_{qd} i_{qsi}^{\hat{r}}, \quad (19)$$

where $$R_{qq} = R_1 + R_2 + \Delta R_2 \cos(2\theta_{err}), \quad (20)$$

$$R_{dd} = R_1 + R_2 - \Delta R_2 \cos(2\theta_{err}), \text{ and} \quad (21)$$

$$R_{qd} = -\Delta R_2 \sin(2\theta_{err}). \quad (22)$$

Solving for d-axis current, $$i_{dsi}^{\hat{r}} = \frac{v_{dsi}^{\hat{r}} - R_{qd} i_{qsi}^{\hat{r}}}{R_{dd} + L_\sigma p}. \quad (23)$$

Solving for q-axis current yields $$i_{qsi}^{\hat{r}} = \frac{(R_{dd} + L_\sigma p) v_{qsi}^{\hat{r}} - R_{qd} v_{dsi}^{\hat{r}}}{(R_{dd} + L_\sigma p)(R_{qq} + L_\sigma p) - R_{qd}^2}, \text{ or} \quad (24)$$

$$i_{qsi}^{\hat{r}} = \frac{(R_{dd} + L_\sigma p) v_{qsi}^{\hat{r}} - R_{qd} v_{dsi}^{\hat{r}}}{L_\sigma^2 p^2 + (R_{qq} + R_{dd}) L_\sigma p + R_{qq} R_{dd} - R_{qd}^2}. \quad (25)$$

With voltage signal injection as per FIG. 5, the q-axis stator signal voltage is zero; i.e., $$v_{qsi}^{\hat{r}} = 0. \quad (26)$$

The corresponding stator signal current is then $$i_{qsi}^{\hat{r}} = \frac{-R_{qd}}{L_\sigma^2 p^2 + (R_{qq} + R_{dd}) L_\sigma p + R_{qq} R_{dd} - R_{qd}^2} v_{dsi}^{\hat{r}}, \quad (27)$$

which from Equations (20–22) leads to $$i_{qsi}^{\hat{r}} = \frac{-\Delta R_2 \sin(2\theta_{err})}{L_\sigma^2 p^2 + 2(R_1 + R_2) L_\sigma p + (R_1 + R_2)^2 - \Delta R_2^2} v_{dsi}^{\hat{r}}. \quad (28)$$

The numerator contains the desired error term and the denominator is constant.

With the d-axis stator voltage equal to, $$v_{dsi}^{\hat{r}} = V_{pki} \sin \theta_i, \quad (29)$$

and for most motors with the signal frequency high enough, $$L_\sigma^2 \omega_i^2 >> 2(R_1+R_2) L_\sigma \omega_i + (R_1+R_2)^2 - \Delta R_2^2, \quad (30)$$

the q-axis stator voltage is then approximately, $$i_{qsi}^{\hat{r}} \cong \frac{-\Delta R_2}{L_\sigma^2 \omega_i^2} V_{pki} \sin(2\theta_{err}) \sin\theta_i. \quad (31)$$

Multiplication of the signal voltage by $-\sin \theta_i$ in block 46 followed by low pass filtering in LPF 48 yields a similar error term as in Equation (12), $$\varepsilon = LPF\left[-i_{qsi}^{\hat{r}} \sin\theta_i\right] \cong \frac{\Delta R_2}{L_\sigma^2 \omega_i^2} V_{pki} \sin(2\theta_{err}) \quad (32)$$

$$\cong \frac{\Delta R_2}{L_\sigma^2 \omega_i^2} V_{pki} \sin\left[2(\theta_r - \hat{\theta}_r)\right].$$

A similar derivation with a non symmetrical stator transient inductance shows that like the results with current signal injection, the voltage signal injection scheme also enables robust rotor resistance variation tracking even with variations in stator transient inductance.

Figure 6:
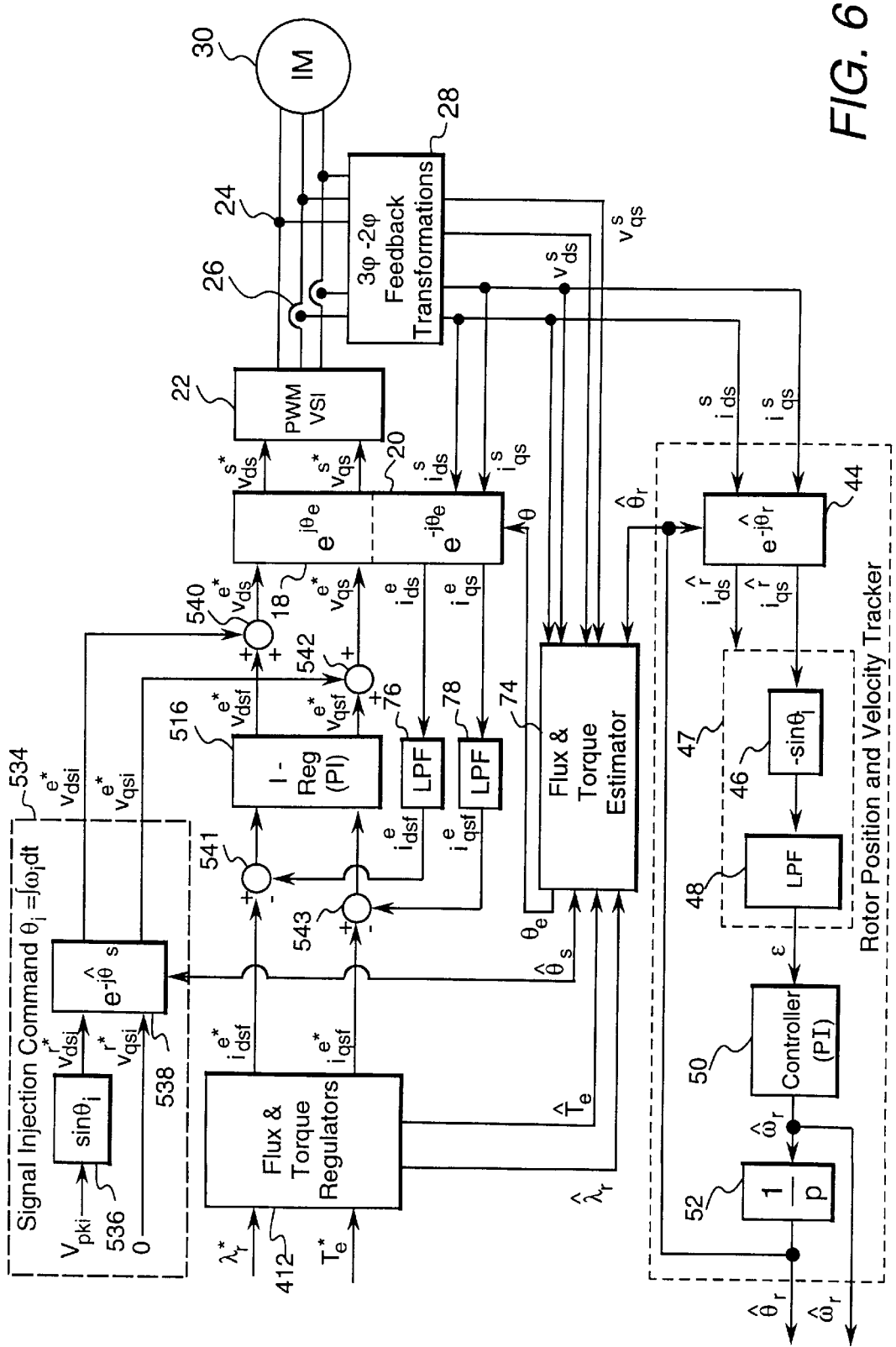
FIG. 6 is a block diagram of another embodiment of the present invention in which a sensorless direct-field-orientation control scheme incorporates ac voltage signal injection to track a high frequency asymmetry in rotor resistance.

FIG. 6 is a block diagram of another embodiment of the present invention in which a sensorless direct-field-orientation control scheme incorporates ac voltage signal injection to track a high frequency asymmetry in rotor resistance. This embodiment is similar to the DFO embodiment for signal current injection of FIG. 4 with the changes discussed above with respect to FIG. 5 and voltage signal injection.

Figure 7:
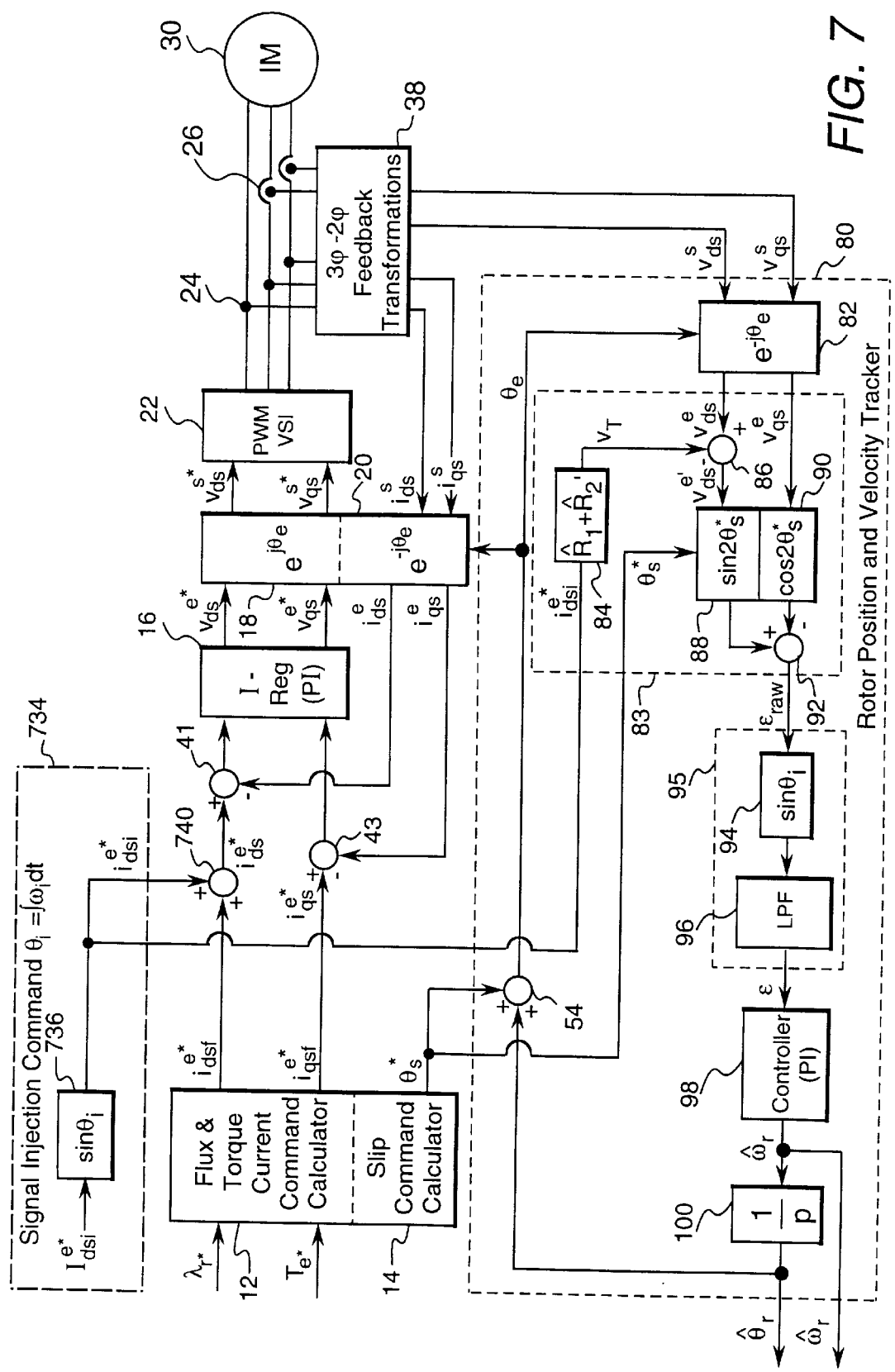
FIG. 7 is a block diagram of another embodiment of the present invention in which a sensorless indirect-field-orientation control scheme uses flux axis current signal injection to track a high frequency asymmetry in the rotor resistance.

FIG. 7 is a block diagram of another embodiment of the present invention in which a sensorless indirect-field-orientation control scheme incorporates flux axis current signal injection to track a high frequency asymmetry in the rotor resistance. Using signal injection in only the rotor flux axis of the controller greatly reduces and sometimes eliminates undesirable torque ripple which can be caused by the signal injection methods of FIGS. 1–6. For this embodiment, a combination ($R_T$) of estimated values of the rotor and stator resistances (which may be fixed or may vary with respect to one or more motor parameters such as temperature, for example) are used by a multiplier 84 for torque ripple reduction.

Although the signal injection portion (736) of the scheme is simpler than that of the prior schemes, the rotor position and velocity tracker is more complicated.

The rotor resistance matrix of an induction motor with asymmetrical rotor resistance can be represented in the rotor reference frame by:

$$\overline{R}_2^r = \begin{bmatrix} R_{2q} & 0 \\ 0 & R_{2d} \end{bmatrix} \quad (33)$$

where $$R_{2q} \neq R_{2d}. \quad (34)$$

The rotor resistance matrix in a reference frame synchronous with the fundamental excitation can be shown to be $$\overline{R}_2^e = \begin{bmatrix} R_2 + \Delta R_2 \cos(2\theta_s) & -\Delta R_2 \sin(2\theta_s) \\ -\Delta R_2 \sin(2\theta_s) & R_2 - \Delta R_2 \cos(2\theta_s) \end{bmatrix}, \quad (35)$$

where $$R_2 = \frac{R_{2q} + R_{2d}}{2}, \text{ and} \quad (36)$$

$$\Delta R_2 = \frac{R_{2q} - R_{2d}}{2}, \quad (37)$$

and $\theta_s$ is the slip angle; i.e., $$\theta_s = \theta_e - \theta_r, \quad (38)$$

where $\theta_e$ and $\theta_r$ are the fundamental excitation and rotor angular positions, respectively.

With an injected signal frequency that is sufficiently high such that back-emf influence is negligible, after the stator feedback voltages $v_{ds}^s, v_{qs}^s$ are transformed from the stator reference frame to the synchronous rotor flux frame by transformer 82, the portion of the stator feedback voltages $v_{ds}^e, v_{qs}^e$ in the synchronous rotor flux frame that is due to the injected signal is represented as $v_{dsi}^e, v_{qsi}^e$ can be estimated by the following equations $$v_{qsi}^e \cong R_1 i_{qsi}^e + L_\sigma p i_{qsi}^e + \frac{L_m^2}{L_r^2} [R_2 + \Delta R_2 \cos(2\theta_s)] i_{qsi}^e - \frac{L_m^2}{L_r^2} \Delta R_2 \sin(2\theta_s) i_{dsi}^e \quad (39)$$

$$v_{dsi}^e \cong R_1 i_{dsi}^e + L_\sigma p i_{dsi}^e + \frac{L_m^2}{L_r^2} [R_2 + \Delta R_2 \cos(2\theta_s)] i_{dsi}^e - \frac{L_m^2}{L_r^2} \Delta R_2 \sin(2\theta_s) i_{qsi}^e \quad (40)$$

where p is the time derivative operation; i.e., p=d/dt. With flux axis signal current injection; i.e., $$i_{qsi}^{e*} = 0, \text{ and} \quad (41)$$

$$i_{dsi}^{e*} = I_{dsi}^{e*} \sin \theta_i, \quad (42)$$

where the instantaneous signal injection angle is $$\theta_i = \int \omega_i dt, \quad (43)$$

the signal voltages reduce to $$v_{qsi}^e \cong -\frac{L_m^2}{L_r^2} \Delta R_2 \sin(2\theta_s) i_{dsi}^e, \text{ and} \quad (44)$$

$$v_{dsi}^e \cong R_1 i_{dsi}^e + L_\sigma p i_{dsi}^e + \frac{L_m^2}{L_r^2} [R_2 - \Delta R_2 \cos(2\theta_s)] i_{dsi}^e. \quad (45)$$

For accurate tracking of rotor position, the last term in Equation (45) containing the rotor slip angle information is preferably isolated. A raw error term determiner 83 provides a raw error term by attenuating non-rotor position dependent components from the flux axis feedback stator signal in the synchronous rotor flux frame (with a multiplier 84 and a subtractor 86, for example) and heterodyning the torque axis feedback stator signal and the attenuated flux axis feedback signal (with sine and cosine blocks 88 and 90, for example).

Introducing estimates of the rotor and stator resistance multiplied by the injected current in multiplier 84 and their subtraction in subtractor 86, Equation (45) can be rewritten as $$v_{dsi}^{e\prime} \equiv v_{dsi}^e - \left( \hat{R}_1 + \frac{\hat{L}_m^2}{\hat{L}_r^2} \hat{R}_2 \right) i_{dsi}^e \quad (46)$$

$$\cong R_{err} i_{dsi}^e + L_\sigma p i_{dsi}^e - \frac{\hat{L}_m^2}{\hat{L}_r^2} \Delta R_2 \cos(2\theta_s) i_{dsi}^e,$$

where $$R_{err} \equiv \left( R_1 + \frac{L_m^2}{L_r^2} R_2 \right) - \left( \hat{R}_1 + \frac{\hat{L}_m^2}{\hat{L}_r^2} \hat{R}_2 \right). \quad (47)$$

Multiplication of the flux and torque axis signal voltages by sin $2\theta_s^*$ and cos $2\theta_s^*$ in blocks 88 and 90 and subtracting the torque axis signal voltage from the flux axis signal voltage with subtractor 92 yields:

$$\varepsilon_{raw} = v_{dsi}^{e'}\sin(2\theta_s^*) - v_{qsi}^e\cos(2\theta_s^*) \quad (48)$$

$$\cong \frac{L_m^2}{L_r^2}\Delta R_2[\cos(2\theta_s)\sin(2\theta_s^*) - \sin(2\theta_s)\cos(2\theta_s^*)]i_{dsi}^e +$$

$$R_{err}\sin(2\theta_s^*)i_{dsi}^e + L_\sigma\sin(2\theta_s^*)pi_{dsi}^e$$

which reduces to $$\varepsilon_{raw} \cong \frac{L_m^2}{L_r^2}\Delta R_2\sin[2(\theta_s - \theta_s^*)]i_{dsi}^e + \quad (49)$$

$$R_{err}\sin(2\theta_s^*)i_{dsi}^e + L_\sigma\sin(2\theta_s^*)pi_{dsi}^e.$$

Combining with Equation (42) yields $$\varepsilon_{raw} \cong \frac{L_m^2}{L_r^2}\Delta R_2\sin[2(\theta_s - \theta_s^*)]I_{dsi}^e\sin\theta_i + \quad (50)$$

$$R_{err}\sin(2\theta_s^*)I_{dsi}^e\sin\theta_i + L_\sigma\sin(2\theta_s^*)I_{dsi}^e\omega_i\cos\theta_i.$$

In phase component isolator 95 includes a block 94 for multiplying Equation (50) by $\sin\theta_i$ and a LPF 96 for low pass filtering to remove the twice signal frequency component (and fundamental) and yields:

$$\varepsilon = LPF(\varepsilon_{raw}\sin\theta_i) \quad (51)$$

$$\cong \frac{1}{2}\left[\frac{L_m^2}{L_r^2}\Delta R_2\sin[2(\theta_s - \theta_s^*)] + R_{err}\sin(2\theta_s^*)\right]I_{dsi}^e.$$

The first term in Equation (51) is the desired error signal between the actual and commanded rotor slip angles. This error signal term is used in an observer or tracking controller as shown in FIG. 7 to track rotor position and velocity. If the second term containing $R_{err}$ is zero, the controller in FIG. 7 will adjust the estimated rotor velocity and position to drive Equation (51) to zero. Since the commanded slip frequency is fixed to set a particular torque and flux operating point, the controller indirectly adjusts the fundamental excitation frequency until the actual slip frequency equals the commanded value. In the process, the rotor position and velocity is tracked.

Like the schemes in FIGS. 1–6, robustness to variations in stator transient inductance is obtained through the use of in-phase signal isolation via in-phase component isolator (which may include sinoi block 94 and low pass filter block 96, for example). The order of the various operations described above can be altered to achieve the same error terms. For example, as is shown in FIG. 8, two $2\sin\theta_i$ blocks 102 and 104 and two low pass filters 106 and 110 can be used to obtain voltage magnitudes (and to provide robustness to variations in stator transient inductance through the use of in-phase signal isolation) prior to a later step of using $\sin 2\theta_s^*$ and $\cos 2\theta_s^*$ in blocks 109 and 111 to obtain an error signal.

Figure 8:
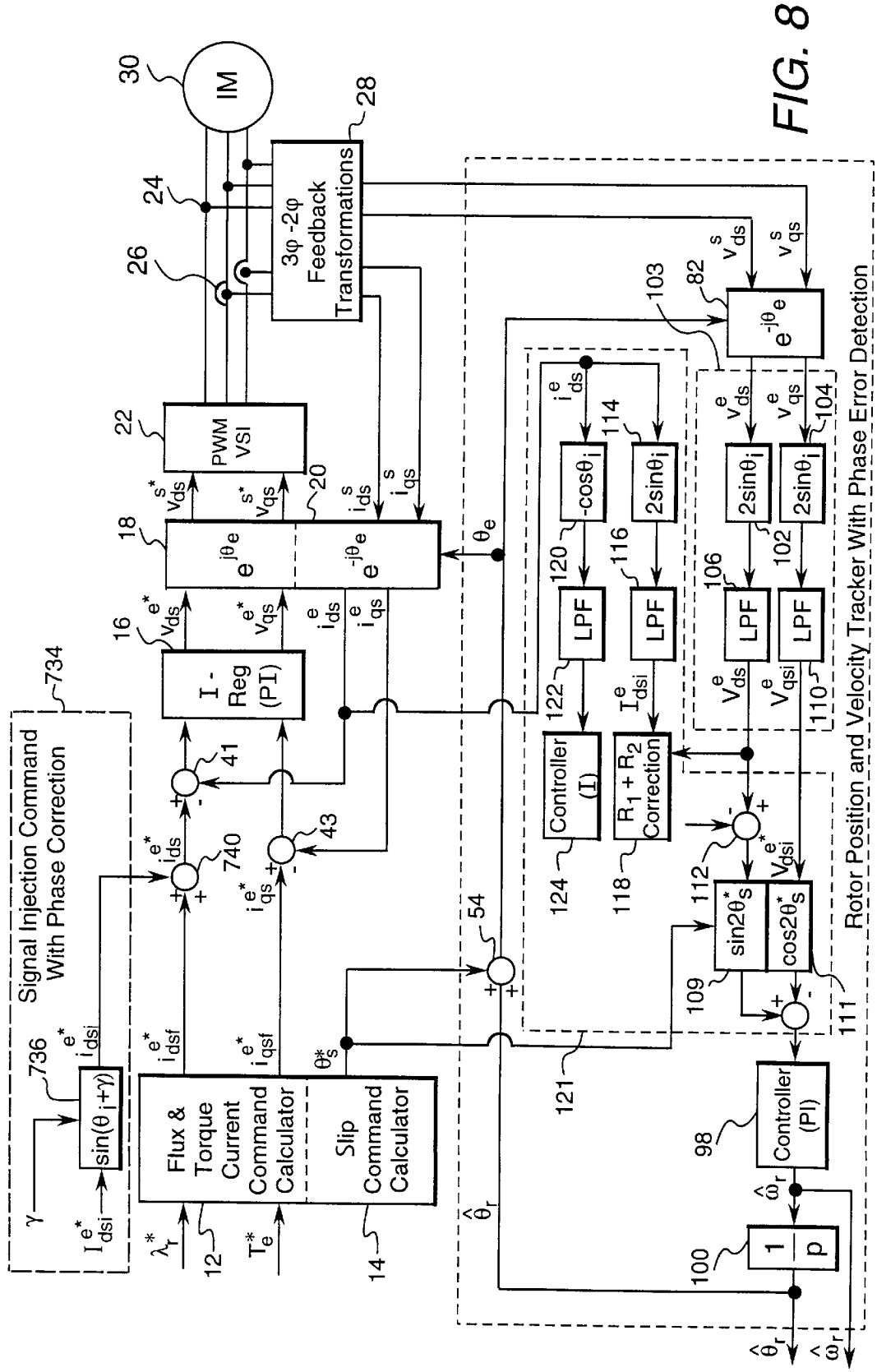
FIG. 8 is a block diagram similar to FIG. 7 with the addition of a signal injection phase correction and real-time resistance tracking and error correction embodiments.

FIG. 8 is a block diagram similar to FIG. 7 with the addition of signal injection phase correction and real-time resistance tracking and error correction embodiments, and FIG. 9 is a block diagram of a real-time resistance error correction embodiment for separating net average resistance and delta rotor resistance in the embodiment of FIG. 8.

In addition to the desired error term, Equation (51) also contains a corruptive term due to the net resistance estimate error $R_{err}$. FIGS. 8 and 9 show an embodiment for minimizing the corruptive term to provide more accurate rotor position tracking.

Measuring the rotor resistance asymmetry in real-time enables the estimation of the average rotor bar temperature during operation. The temperature can be used for motor thermal protection and/or improved field orientation (torque/flux control) accuracy, especially at low speeds. This is a valuable additional feature of this embodiment that is presently not possible with conventional controls and symmetric motors.

The corruptive resistive error term in Equation (51) is minimized in real-time using block "R1+R2 Correction" 118 which is shown in detail in FIG. 9. The input signals to the correction block, $I_{dsi}^e$ and $V_{dsi}^e$, are obtained as follows.

Within an isolated error term determiner 121, the flux axis feedback stator current in the synchronous rotor flux frame $i_{ds}^e$ is multiplied by $2\sin\theta_i$ block 114 and low pass filtered by LPF 116 to provide flux axis signal current magnitude $I_{dsi}^e$.

The feedback stator voltages in the stator reference frame $v_{ds}^s, v_{qs}^s$ are heterodyned in transformer 82 into feedback stator voltages in the synchronous rotor-flux frame $v_{ds}^e, v_{qs}^e$ which, in an in-phase component isolator 103, are multiplied by $2\sin\theta_i$ blocks 102 and 104 and low pass filtered by LPFs 106 and 110 to provide flux and torque axis signal voltage magnitudes $V_{dsi}^e, V_{qsi}^e$.

After heterodyning and filtering, the flux axis signal voltage magnitude can be shown to be $$V_{dsi}^e \cong \left[R_1 + \frac{L_m^2}{L_r^2}R_2 - \frac{L_m^2}{L_r^2}\Delta R_2\cos(2\theta_s)\right]I_{dsi}^e \quad (52)$$

whereas the estimated flux axis signal voltage magnitude resulting from multiplier 128 (shown in FIG. 9) is $$\hat{V}_{dsi}^e = \hat{R}I_{dsi}^e. \quad (53)$$

Equation (53) is for purposes of example only. What is needed is the magnitude of a predetermined stator signal such as, for example, a signal magnitude ($I_{dsi}^e$) derived from the stator current feedback signal such as shown in Equation (53) or a signal current injection magnitude $I_{dsi}^{e*}$. In a voltage injection embodiment, a magnitude of a predetermined stator voltage signal can be divided by resistance $\hat{R}$ and compared with a corresponding flux axis signal current magnitude.

The estimated flux axis voltage magnitude is subtracted from the flux axis voltage magnitude with subtractor 130 and a controller, shown as an integral controller 132 with gain $\beta_1$, drives the error between the actual and estimated voltage magnitudes to zero by providing an output signal to adder 133 to adjust the net instantaneous resistance $\hat{R}$ seen by the flux axis signal. In an optional embodiment, initial estimates $\hat{R}_{10}+\hat{R}_{20}'$ are provided to an adder 133 and an adder 144 to enable initial rotor position tracking and to aid in resistance tracking. The value of $\hat{R}$ thus tracks the net instantaneous resistance seen by the flux axis signal, including the variation due to rotor asymmetry.

By recording (in minimum and maximum calculator 134) and averaging (in average calculator 138) the minimum and maximum values of $\hat{R}$ over at least half the period of the rotor slip frequency, subtracting (with subtractor 140) the average from the estimated values of $\hat{R}_1+\hat{R}_2'$, and using a tracking filter 142 with gain $\beta_2$ to drive a resistance estimate to the average of $\hat{R}$, the process achieves the following calculation:

$$(\hat{R}_1 + \hat{R}'_2) \to \frac{1}{2}(\hat{R}_{max} + \hat{R}_{min}) \cong \left(R_1 + \frac{L_m^2}{L_r^2}R_2\right). \quad (54)$$

Within the isolated error term determiner 121, the resistance estimate ($\hat{R}_1+\hat{R}_2'$) is multiplied by the flux axis current $I_{dsi}^e$ by multiplier 146 and subtracted from the flux axis voltage $V_{dsi}^e$ by subtractor 112 according to according to Equation (46) to provide $V_{dsi}^{e'}$ which, as shown in FIG. 8, is multiplied by sin $2\theta_s$* block 109 and subtracted from the cos $2\theta_s$* block 111 multiple of $V_{qsi}^e$. The difference (the isolated error term) is sent to controller 98 which uses the error term as discussed with respect to FIG. 7 to track rotor position and velocity.

Since this embodiment actually measures the resistance in real-time, it thus corrects for resistance variation due to temperature changes. A real-time measurement of the rotor resistance asymmetry, $\Delta\hat{R}$, is also obtained from the difference in maximum and minimum tracked resistance values (calculated by delta calculator 136). Because the asymmetry is contained only in the rotor, $\Delta\hat{R}$ will vary only as a function of the rotor temperature, not the stator or cable temperature. Thus $\Delta\hat{R}$ can be used to accurately estimate the average rotor bar temperature (assuming bar asymmetry), without influence from the stator and cable temperature effects and thermal model assumptions. The rotor bar temperature is especially useful for motor thermal protection and/or for slip adaptation at low speeds to improve field orientation accuracy. Precise rotor temperature estimation is otherwise not possible at low speeds. A mapping of the influence of temperature on rotor conductor skin effects may be required, but this can be readily predetermined from the motor design.

FIG. 8 additionally shows phase correction obtained by block 120, low pass filter 122 and controller 124 which operate in a similar manner as block 68, LPF 70, and controller 72 of FIG. 3.

Figure 10:
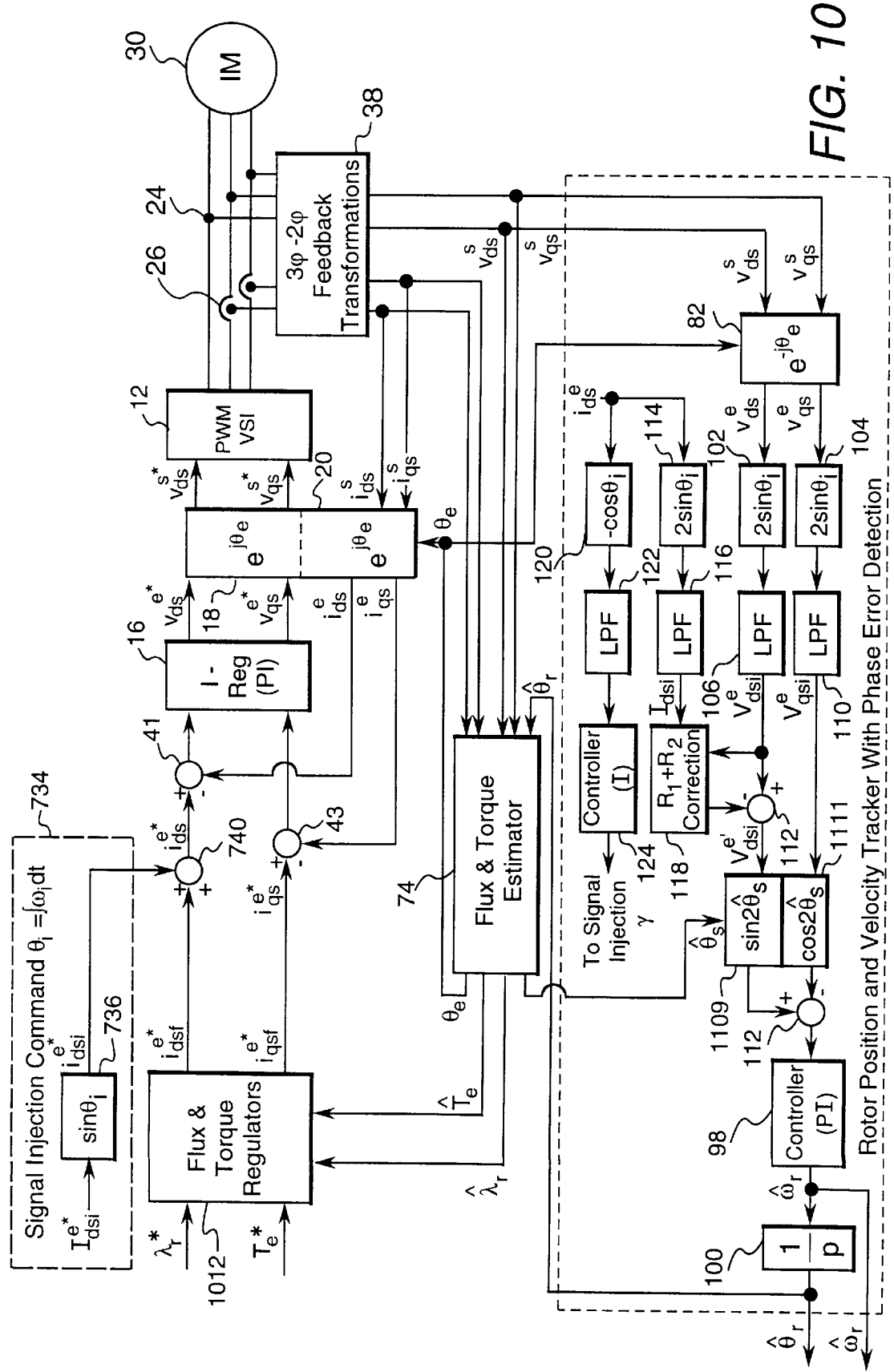
FIG. 10 is a block diagram of another embodiment of the present invention in which a sensorless direct-field-orientation control scheme incorporates flux axis current signal injection to track a high frequency asymmetry in the rotor resistance with signal injection phase correction and real-time resistance tracking and error correction.

FIG. 10 is a block diagram of another embodiment of the present invention in which a sensorless direct-field-orientation control scheme incorporates flux axis current signal injection to track a high frequency asymmetry in the rotor resistance with signal injection phase correction and real-time resistance tracking and error correction. Flux and Torque estimator 74 operates in a similar manner as discussed with respect to FIG. 4.

Although FIGS. 7–10 related to current command signal injection, voltage command signal injection can be used for any of these embodiments. The modifications needed to use a voltage command would be similar to those discussed with respect to FIGS. 5 and 6 with the added change of multiplier 84 (FIG. 7) and correction block 146 (FIG. 9) being used to multiply an effective impedance defined by:

$$\frac{\hat{R}_1 + \hat{R}_2}{\hat{L}_\sigma^2 p^2 + 2(\hat{R}_1 + \hat{R}_2)\hat{L}_\sigma p + (R_1 + R_2)^2 - \Delta R_2^2}. \quad (55)$$

While only certain preferred features of the invention have been illustrated and described herein, many modifications and changes will occur to those skilled in the art. It is, therefore, to be understood that the appended claims are intended to cover all such modifications and changes as fall within the true spirit of the invention.

I claim:

1. A drive system for providing ac drive power to an induction machine with asymmetrical rotor resistance and for sensorless rotor tracking of the induction machine, the drive system comprising:

(a) a signal injector for determining a nonrotating ac stator command signal in one or more axes in a reference frame aligned with an estimated rotor position (an estimated rotor reference frame) and transforming the determined stator command signal to a reference frame suitable for injection into the drive system, the drive system being adapted to use the transformed stator command signal to provide an injected stator signal to the induction machine;

(b) a signal determiner for determining a feedback stator signal of the induction machine in a stator reference frame;

(c) a rotor position and velocity tracker (RPVT) for using the feedback stator signal to estimate a rotor position, the RPVT including an RPVT transformer for transforming the feedback stator signal into a feedback stator signal in the estimated rotor reference frame, an RPVT in-phase component isolator for extracting a component of the feedback stator signal in the estimated rotor reference frame which is orthogonal to the one or more axes in the estimated rotor reference frame in which the stator command signal is determined, and which is in-phase with the injected stator signal, to isolate an error term, and a controller for generating a rotor position estimate by driving the isolated error term towards zero.

2. The drive system of claim 1 wherein the signal injector determines and transforms a stator current command signal, and wherein the rotor position and velocity tracker uses feedback stator voltage signals.

3. The drive system of claim 2 wherein:

the signal injector includes:

a signal injector calculator for determining the stator current command signal by multiplying an ac injected current magnitude by sin $\theta_i$, wherein $\theta_i$ is a selected signal injection angle, and a signal injector transformer for transforming the determined stator current command signal by using a slip angle to transform the determined stator current command signal and a signal set to zero (0) into transformed stator current command signals; and wherein the RPVT in-phase component isolator multiplies the feedback stator signal in the estimated rotor reference frame by −sin $\theta_i$.

4. The drive system of claim 3 wherein the signal determiner determines feedback stator current signals in addition to the feedback stator voltage signals;

wherein the rotor position and velocity tracker further includes a second RPVT transformer for transforming the feedback stator current signals into a feedback stator current signal in the estimated rotor reference frame aligned with the one or more axes in the estimated rotor reference frame into which the stator command signal is determined;

a second RPVT isolator for multiplying the transformed feedback stator current signal by −cos $\theta_i$ to provide an extracted feedback stator current signal and filtering the extracted feedback stator current signal; and a second controller for generating the phase correction angle by driving the filtered extracted feedback stator current signal towards zero; and wherein the signal injector uses the phase correction angle to adjust the phase of the determined stator current signal.

5. The drive system of claim 3 wherein
the signal determiner determines feedback stator current signals in addition to the feedback stator voltage signals;
wherein the rotor position and velocity tracker further includes
a second RPVT transformer for transforming the feedback stator current signals into a feedback stator current signal in the estimated rotor reference frame aligned with the one or more axes in the estimated rotor reference frame into which the stator command signal is determined;
a second RPVT isolator for multiplying the transformed feedback stator current signal by $-\cos\theta_i$ to provide an extracted feedback stator current signal and filtering the extracted feedback stator current signal; and
a second controller for generating the phase correction angle by driving the filtered extracted feedback stator current signal towards zero; and
wherein the first RPVT isolator uses the phase correction angle to isolate the error term.

6. The drive system of claim 1 wherein the RPVT includes:
an adder for adding an output of the controller and a torque feedforward signal; and
a mechanical system model of the rotor and a motor load including at least an estimate of a moment of inertia of the motor load.

7. The drive system of claim 1 further including a flux and torque estimator for using the rotor position to generate an estimated rotor slip angle for use by the signal injector in transforming the determined stator command signal.

8. The drive system of claim 1 wherein the signal injector determines and transforms a stator voltage command signal, and wherein the rotor position and velocity tracker uses feedback stator current signals.

9. The drive system of claim 8 wherein:
the signal injector includes:
a signal injector calculator for determining the stator voltage command signal by multiplying an ac injected voltage magnitude by $\sin\theta_i$, wherein $\theta_i$ is a selected signal injection angle, and
a signal injector transformer for transforming the determined stator voltage command signal by using a slip angle to transform the determined stator voltage command signal and a signal set to zero (0) into transformed stator voltage command signals; and
wherein the RPVT in-phase component isolator multiplies the feedback stator signal in the estimated rotor reference frame by $-\sin\theta_i$.

10. A drive system for providing ac drive power to an induction machine with asymmetrical rotor resistance and for sensorless rotor tracking of the induction machine, the drive system comprising:
(a) a signal injector for determining and injecting a flux axis stator command signal in a synchronous rotor-flux frame, the drive system being adapted to use the injected stator command signal to provide injected power to the induction machine;
(b) a signal determiner for determining feedback stator signals of the induction machine in a stator reference frame;
(c) a rotor position and velocity tracker (RPVT) for using feedback stator signals to estimate a rotor position, the RPVT including:

a transformer for transforming the feedback stator signals into flux axis and torque axis feedback stator signals in the synchronous rotor flux frame,
a raw error term determiner for determining a raw error term by attenuating non-rotor position dependent components from the flux axis feedback stator signal in the synchronous rotor flux frame and heterodyning the torque axis feedback stator signal in the synchronous rotor flux frame, heterodyning the attenuated flux axis feedback stator signal in the synchronous rotor flux frame, and subtracting the heterodyned torque axis feedback stator signal from the heterodyned attenuated flux axis feedback signal;
an RPVT in-phase signal isolator for extracting a component of the raw error term which is in-phase with the injected stator command signal and isolating an error term, and
a controller for generating a rotor position estimate by driving the isolated error term towards zero.

11. The drive system of claim 10 wherein the signal injector for determining and injecting the stator command signal determines and injects a stator current flux axis command signal ($i_{dsi}^{e*}$ signal), and wherein the rotor position and velocity tracker for using the feedback stator signals to estimate the rotor position uses feedback stator voltage signals ($v_{ds}^s, v_{qs}^s$ signals).

12. The drive system of claim 11 wherein the raw error determiner attenuates the non-rotor position dependent components from the flux axis feedback stator signal by multiplying the injected stator command signal by a resistance $R_T$ representing an estimation of a combination rotor and stator resistances to obtain an estimated voltage signal ($v_T$ signal) and subtracting the estimated voltage signal from the flux axis feedback stator signal in the synchronous rotor flux frame to obtain the attenuated flux axis feedback stator signal.

13. The drive system of claim 12 wherein the estimated resistance is a fixed resistance or a variable resistance.

14. The drive system of claim 10 further including a flux and torque estimator for using the rotor position to generate a rotor flux angle for field orientation.

15. A drive system for providing ac drive power to an induction machine with asymmetrical rotor resistance and for sensorless rotor tracking of the induction machine, the drive system comprising:
(a) a signal injector for determining a flux axis stator command signal in a synchronous rotor-flux frame, the drive system being adapted to use the determined stator command signal to provide an injected stator signal to the induction machine;
(b) a signal determiner for determining feedback stator signals of the induction machine in a stator reference frame;
(c) a rotor position and velocity tracker (RPVT) for using the feedback stator signals to estimate a rotor position, the RPVT including:
a transformer for transforming the feedback stator signals into flux axis and torque axis feedback stator signals in the synchronous rotor flux frame,
RPVT in-phase signal isolators for extracting components of the flux axis and torque axis feedback stator signals in the synchronous rotor flux frame which are in-phase with the injected stator signal and providing corresponding flux axis and torque axis feedback signal magnitudes;
an isolated error term determiner for determining an isolated error term by attenuating non-rotor position dependent components from the flux axis feedback signal magnitude, heterodyning the torque axis feedback stator signal magnitude, heterodyning the attenuated flux axis feedback stator signal magnitude, and subtracting the heterodyned torque axis feedback stator signal magnitude from the heterodyned attenuated flux axis feedback signal;

a controller for generating a rotor position estimate by driving the isolated error term towards zero.

16. The drive system of claim 15 wherein the signal injector determines a stator current command signal ($i_{dsi}^{e*}$ signal), and wherein the rotor position and velocity tracker for using the feedback stator signals to estimate the rotor position uses feedback stator voltage signals ($v_{ds}^{s}, v_{qs}^{s}$ signals).

17. The drive system of claim 16 wherein the isolated error determiner attenuates the non-rotor position dependent components from the flux axis feedback stator signal magnitude by multiplying a magnitude of the injected stator command signal by a resistance $R_T$ representing an estimation of a combination rotor and stator resistances to obtain an estimated voltage magnitude and subtracting the estimated voltage magnitude from the flux axis feedback stator signal magnitude to obtain the attenuated flux axis feedback stator signal magnitude.

18. The drive system of claim 17 wherein the estimated resistance is a fixed resistance or a variable resistance.

19. The drive system of claim 17 wherein the isolated error determiner further is adapted to obtain a value of resistance $R_T$ by:

determining maximum and minimum values of a net instantaneous resistance as seen by the flux axis feedback stator signal, calculating the average of the maximum and minimum values, and filtering the average of the maximum and minimum values, wherein the net instantaneous resistance is calculated in a feedback loop by multiplying the net instantaneous resistance with a magnitude of a predetermined stator current signal to obtain an estimated flux axis signal voltage magnitude, and using an integral controller to drive the difference between the flux axis feedback stator signal magnitude and the estimated flux axis signal voltage magnitude to zero.

20. The drive system of claim 19 wherein the isolated error determiner further is adapted to determine the resistance difference between the maximum and minimum values of the net instantaneous resistance and to provide the resistance difference for rotor temperature estimation.

21. The drive system of claim 19 wherein the isolated error determiner further is adapted to determine the resistance difference between the maximum and minimum values of the net instantaneous resistance and to provide the resistance difference for slip adaptation to improve field orientation accuracy.

22. The drive system of claim 15 further including a flux and torque estimator for using the rotor position to generate a rotor flux angle for field orientation.

23. The drive system of claim 15 wherein the isolated error determiner further is adapted to obtain a value of resistance $R_T$ by:

determining maximum and minimum values of a net instantaneous resistance as seen by the flux axis feedback stator signal, calculating the average of the maximum and minimum values, filtering the average of the maximum and minimum values, wherein the net instantaneous resistance is calculated in a feedback loop by using the net instantaneous resistance and a magnitude of a predetermined stator signal to obtain an estimated flux axis signal magnitude, and using an integral controller to drive the difference between a magnitude of the flux axis feedback stator signal in the synchronous rotor flux frame and the estimated flux axis signal magnitude to zero.

24. A drive system for providing ac drive power to an induction machine with asymmetrical rotor resistance and for sensorless rotor tracking of the induction machine, the drive system comprising:

(a) a signal injector for determining a flux axis stator command signal in a synchronous rotor-flux frame, the drive system being adapted to use the determined stator command signal to provide an injected stator signal to the induction machine;

(b) a signal determiner for determining feedback stator signals of the induction machine in a stator reference frame;

(c) a rotor position and velocity tracker (RPVT) for using feedback stator signals to estimate a rotor position, the RPVT including:

a transformer for transforming the feedback stator signals into flux axis and torque axis feedback stator signals in the synchronous rotor flux frame, an isolator and an error determiner for extracting and heterodyning a component of the feedback stator signals in the synchronous rotor flux frame which is in-phase with the injected stator signal to determine an isolated error term, and a controller for generating a rotor position estimate by driving the isolated error term towards zero.

25. A method for providing ac drive power to an induction machine with asymmetrical rotor resistance and for sensorless rotor tracking of the induction machine, the method comprising:

(a) determining a nonrotating ac stator command signal in one or more axes in a reference frame aligned with an estimated rotor position (an estimated rotor reference frame);

(b) transforming the determined stator command signal to a reference frame suitable for injection, (c) using the transformed determined stator command signal to provide injected power to the induction machine;

(d) determining a feedback stator signal of the induction machine in a stator reference frame;

(e) using the feedback stator signal to estimate a rotor position by transforming the feedback stator signal into a feedback stator signal in the estimated rotor reference frame, extracting a component of the feedback stator signal in the estimated rotor reference frame which is orthogonal to the one or more axes in the estimated rotor reference frame in which the stator command signal is determined, and which is in-phase with the stator command signal, to isolate an error term, and generating a rotor position estimate by driving the isolated error term towards zero.

26. A method for providing ac drive power to an induction machine with asymmetrical rotor resistance and for sensorless rotor tracking of the induction machine, the method comprising:

(a) determining a flux axis stator command signal in a synchronous rotor-flux frame and using the determined stator command signal to provide an injected stator signal to the induction machine;

(b) determining feedback stator signals of the induction machine in a stator reference frame;

(c) using feedback stator signals to estimate a rotor position by
transforming the feedback stator signals into flux axis and torque axis feedback stator signals in the synchronous rotor flux frame,
extracting and heterodyning a component of the feedback stator signals in the synchronous rotor flux frame which is in-phase with the injected stator signal to determine an isolated error term, and
generating a rotor position estimate by driving the isolated error term towards zero.

27. The method of claim 26 wherein extracting and heterodyning the component of the feedback stator signals in the synchronous rotor flux frame which is in-phase with the injected stator signal to determine the isolated error term includes attenuating non-rotor position dependent components.

* * * * *